United States Patent
Nikko

(10) Patent No.: US 11,327,056 B2
(45) Date of Patent: May 10, 2022

(54) PLUNGER PUMP

(71) Applicant: SHIMADZU CORPORATION, Kyoto (JP)

(72) Inventor: Masataka Nikko, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 338 days.

(21) Appl. No.: 16/639,432

(22) PCT Filed: Sep. 12, 2017

(86) PCT No.: PCT/JP2017/032759
§ 371 (c)(1),
(2) Date: Feb. 14, 2020

(87) PCT Pub. No.: WO2019/053763
PCT Pub. Date: Mar. 21, 2019

(65) Prior Publication Data
US 2021/0132009 A1    May 6, 2021

(51) Int. Cl.
*G01N 30/32* (2006.01)
*F04B 19/04* (2006.01)
*G01L 9/04* (2006.01)

(52) U.S. Cl.
CPC .............. *G01N 30/32* (2013.01); *F04B 19/04* (2013.01); *G01L 9/04* (2013.01); *G01N 2030/326* (2013.01)

(58) Field of Classification Search
CPC .... G01L 9/04; G01N 2030/326; G01N 30/32; G04B 19/04
USPC .......................................................... 73/61.56
See application file for complete search history.

(56) References Cited

U.S. PATENT DOCUMENTS

| 3,498,123 | A | * | 3/1970 | Takeshi | ............... G01M 13/005 73/114.78 |
| 3,847,507 | A | * | 11/1974 | Sakiyama | ............. B01L 3/0206 417/42 |
| 3,922,957 | A | * | 12/1975 | Ogle | ...................... G01N 30/36 92/137 |
| 4,310,420 | A | * | 1/1982 | Konishi | .................. F04B 13/02 210/659 |

(Continued)

FOREIGN PATENT DOCUMENTS

| JP | H03-119380 U | 12/1991 |
| JP | 2000-266736 A | 9/2000 |

(Continued)

OTHER PUBLICATIONS

International Search Report for corresponding Application No. PCT/JP2017/032759, dated Nov. 28, 2017.

(Continued)

*Primary Examiner* — Nathaniel T Woodward
(74) *Attorney, Agent, or Firm* — Renner, Otto, Boisselle & Sklar, LLP

(57) ABSTRACT

A plunger pump includes, independently of a pump head, a pressure detection apparatus independently having a sensor part for detecting a fluid pressure, and the pump head and the pressure detection apparatus are detachably mounted with a communication member sandwiched between them. Therefore, when the pressure detection apparatus fails, only the pressure detection apparatus can be replaced, and the pump head can be used as it is without replacement.

8 Claims, 3 Drawing Sheets

(56) References Cited

U.S. PATENT DOCUMENTS

| | | | |
|---|---|---|---|
| 4,681,513 A * | 7/1987 | Saito | F04B 49/06 |
| | | | 417/18 |
| 11,098,702 B2 * | 8/2021 | Yanagibayashi | F04B 11/0075 |
| 2004/0001761 A1 * | 1/2004 | Wu | F04B 33/005 |
| | | | 417/63 |
| 2008/0260558 A1 * | 10/2008 | Luongo | F04B 53/162 |
| | | | 73/726 |
| 2008/0296209 A1 * | 12/2008 | Takao | G01N 30/32 |
| | | | 210/96.1 |
| 2013/0334117 A1 * | 12/2013 | Joudrey | F04B 53/08 |
| | | | 165/104.19 |
| 2018/0147519 A1 * | 5/2018 | Van Goor | F04B 23/06 |

FOREIGN PATENT DOCUMENTS

| | | |
|---|---|---|
| JP | 2003-098166 A | 4/2003 |
| WO | 2005/093257 A1 | 10/2005 |

OTHER PUBLICATIONS

Written Opinion for corresponding Application No. PCT/JP2017/032759, dated Nov. 28, 2017.
Chinese Office Action for corresponding Patent Application No. 201780092817.8 dated Sep. 3, 2021, with an English translation.

* cited by examiner

PLUNGER PUMP

TECHNICAL FIELD

The present invention relates to a plunger pump used for feeding a mobile phase in an analyzing apparatus such as a high performance liquid chromatograph (HPLC) or a supercritical fluid chromatograph (SFC).

BACKGROUND

A liquid feeding apparatus used in an HPLC system is required to have a capability of stably feeding a mobile phase at a high pressure. Therefore, a double plunger type liquid feeding apparatus in which two plunger pumps are connected in series or in parallel is generally used.

As an example, in a liquid feeding apparatus in which two plunger pumps are connected in series, a primary plunger pump on an upstream side and a secondary plunger pump on a downstream side operate in a complementary manner, and as liquid feeding processes thereof, there are a liquid feeding process by the primary plunger pump and a liquid feeding process by the secondary plunger pump.

In the liquid feeding process by the primary plunger pump, the secondary plunger pump performs a suction operation while the primary plunger pump discharges a liquid, and a part of the liquid discharged by the primary plunger pump is sucked by the secondary plunger pump. In the liquid feeding process by the secondary plunger pump, the secondary plunger pump performs a discharge operation, and the primary plunger pump performs a suction operation during that time.

In the liquid feeding process by the primary plunger pump, a flow rate obtained by subtracting a suction flow rate of the secondary plunger pump from a discharge flow rate of the primary plunger pump is a liquid feeding flow rate. In the liquid feeding process by the secondary plunger pump, the discharge flow rate of the secondary plunger pump is the liquid feeding flow rate.

Such an in-line type double plunger type liquid feeding apparatus is provided with valves for preventing backflow on an inlet side and an outlet side of the primary plunger pump. When the primary plunger pump performs the discharge operation, the valve on the inlet side is closed, and when the primary plunger pump performs the suction operation, the valve on the inlet side is opened and the valve on the outlet side is closed.

Since the suction operation of the primary plunger pump is performed with the valve on the outlet side closed, a pressure in a pump chamber of the primary plunger pump after the suction operation of the primary plunger pump ends is put into a state lower than a system pressure (pressure inside an analysis flow path of the HPLC or the SFC). If the pump that performs the discharge operation in this state is switched from the secondary plunger pump to the primary plunger pump, the liquid will not flow from the primary plunger pump until the pressure inside the pump chamber of the primary plunger pump rises to the same pressure as the system pressure. As a result, the liquid feeding flow rate is temporarily lowered, and the stability of the liquid feeding flow rate is lowered.

Because of these problems, it is common that the primary plunger pump is adapted to perform a preload operation that drives a plunger in a discharge direction so that the pressure inside the pump chamber is raised to a pressure close to the system pressure in addition to the suction operation of the liquid during the liquid feeding process by the secondary plunger pump. It is true of a parallel-type double plunger type liquid feeding apparatus in which two plunger pumps are connected in parallel, and while one of the plunger pumps performs the discharge operation, the other plunger pump performs the suction operation and the preload operation.

A technique of providing a pressure sensor for detecting the pressure inside the pump chamber of the plunger pump performing the preload operation has been proposed in order to monitor a pressure state inside the pump chamber of the plunger pump, and this technique has been also implemented (see Patent Documents 1 to 4).

PRIOR ART DOCUMENTS

Patent Documents

Patent Document 1: U.S. Pat. No. 8,333,568B2
Patent Document 2: Japanese Patent Laid-open Publication No. 2000-266736
Patent Document 3: Utility Model Registration No. 3119380
Patent Document 4: Japanese Patent Laid-open Publication No. 2003-98166

SUMMARY OF THE INVENTION

Problems to be Solved by the Invention

As a method of providing the pressure sensor for detecting the pressure inside the pump chamber, it is common to connect the pressure sensor to an outlet of a pump head through piping. However, if the pressure sensor is connected to the outlet of the pump head through the piping, work of installing the piping when the apparatus is assembled becomes complicated. Further, since the piping is added downstream of the pump head, an internal capacity downstream of the pump head increases, and a time required for replacing the liquid inside the system becomes longer.

On the other hand, in plunger pumps disclosed in Patent Document 1 and Patent Document 2, a pressure sensor for detecting the pressure inside the pump chamber is provided integrally with the pump head. That is, in Patent Document 1 and Patent Document 2, a part of the pump head serves as a part of the pressure sensor. If the pressure sensor is configured integrally with the pump head in this way, there is no piping for connecting the pressure sensor downstream of the pump head, and thus, the internal capacity downstream of the pump head does not increase. However, since the pressure sensor is integrated with the pump head, replacement of each pump head is necessary even when a pressure detecting apparatus portion fails, and there is a problem that a cost of parts replacement becomes high.

The present invention has been made in view of the above problems, and an object of the present invention is to avoid adding extra piping on a downstream side of a pump head while separating a pressure sensor from the pump head.

Solutions to the Problems

A plunger pump according to the present invention includes a pump head, a plunger, a drive mechanism, a communication member, and a pressure detection apparatus.

The pump head comprises a pump chamber, an inlet flow path and an outlet flow path therein. The inlet flow path and the outlet flow path communicate with the pump chamber. The pump head is further provided with a pump head-side recess in an outer surface, the pump head-side recess has an opening in a bottom surface, the opening leads to the outlet flow path.

The plunger has a tip end portion slidably inserted into the pump chamber.

The drive mechanism is configured to reciprocate the plunger in an axial direction of the plunger.

The communication member has a through hole extending from one end to another end of the communication member. The communication member is in a state where a portion including the one end is fitted into the pump head-side recess so that the through hole communicates with the outlet flow path, and a portion including the other end protrudes from the pump head-side recess.

The pressure detection apparatus has a sensor part, an upstream flow path and a downstream flow path therein. The sensor part is for detecting a fluid pressure, the upstream flow path is for leading a liquid into the sensor part, and the downstream flow path for leading the liquid having passed the sensor part to outside of the sensor part. The pressure detection apparatus is further provided with a sensor-side recess in an outer surface, the sensor-side recess has an opening, which is leading to the upstream flow path, in a bottom surface. The pressure detection apparatus is detachably mounted on the pump head in a state where the portion including the other end of the communication member protruded from the pump head-side recess is fitted into the sensor-side recess so that the upstream flow path is communicated with the outlet flow path through the through hole.

In this invention, it is preferable that the pressure detection apparatus has a piping connection part, which is for connecting piping to the downstream flow path, in an outer surface. As such, the liquid discharged from the pump chamber and flowing into the pressure detection apparatus can be fed through the piping connected to the piping connection part. This allows only one connection point to be provided between the pump head and the pressure detection apparatus, so that the structure becomes simple.

Moreover, in the present invention, the pressure detection apparatus may be fixed to the pump head by a bolt. This makes easy the attachment or detachment of the pressure sensor with respect to the pump head.

Effects of the Invention

The plunger pump according to the present invention includes, independently of the pump head, the pressure detection apparatus independently having the sensor part for detecting the fluid pressure and the pump head and the pressure detection apparatus are detachably mounted with the communication member sandwiched between them. Therefore, when the pressure detection apparatus fails, only the pressure detection apparatus can be replaced, and the pump head can be used as it is without replacement. Further, in the pump chamber inside the pump head, and the sensor part in the pressure detection apparatus, the communication member is fitted into each of the pump head-side recess of the pump head and the sensor-side recess of the pressure detection apparatus, by which the pump chamber and the sensor part are communicated with each other. Therefore, the connection portion between the pump head and the pressure detection apparatus has a simple structure, and the pressure detection apparatus can be easily attached or detached with respect to the pump head.

EMBODIMENT OF THE INVENTION

Figure 1:
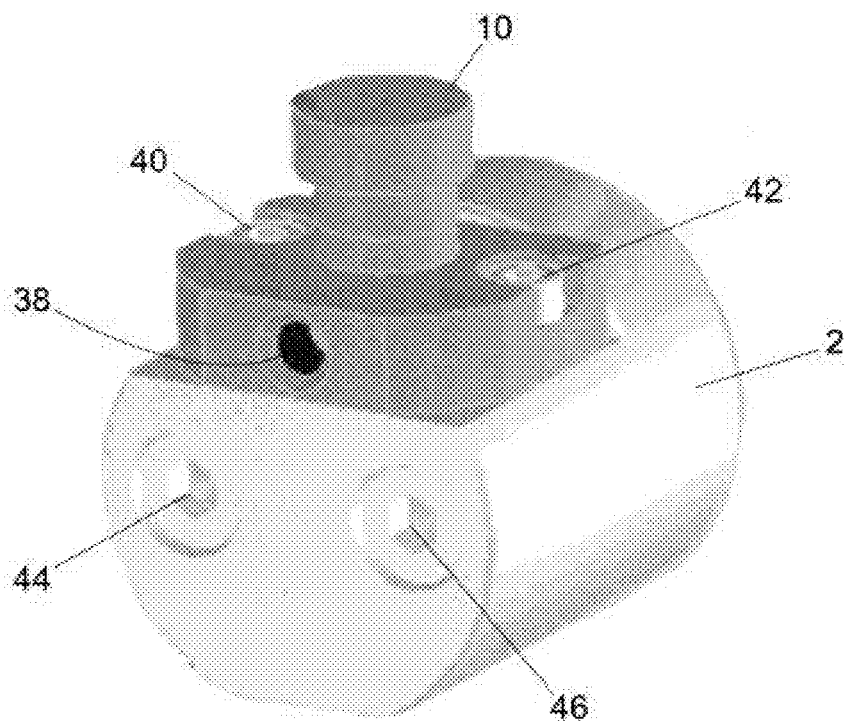
FIG. 1 is a perspective view showing a pump head portion of a plunger pump according to one embodiment.

One embodiment of a plunger pump according to the present invention will be described with reference to FIGS. 1 to 4. Note that FIGS. 1 and 2 show a state where a pressure detection apparatus 10 is attached to a pump head 2, and FIGS. 3 and 4 show a state where the pressure detection apparatus 10 is removed from the pump head 2.

Figure 2:
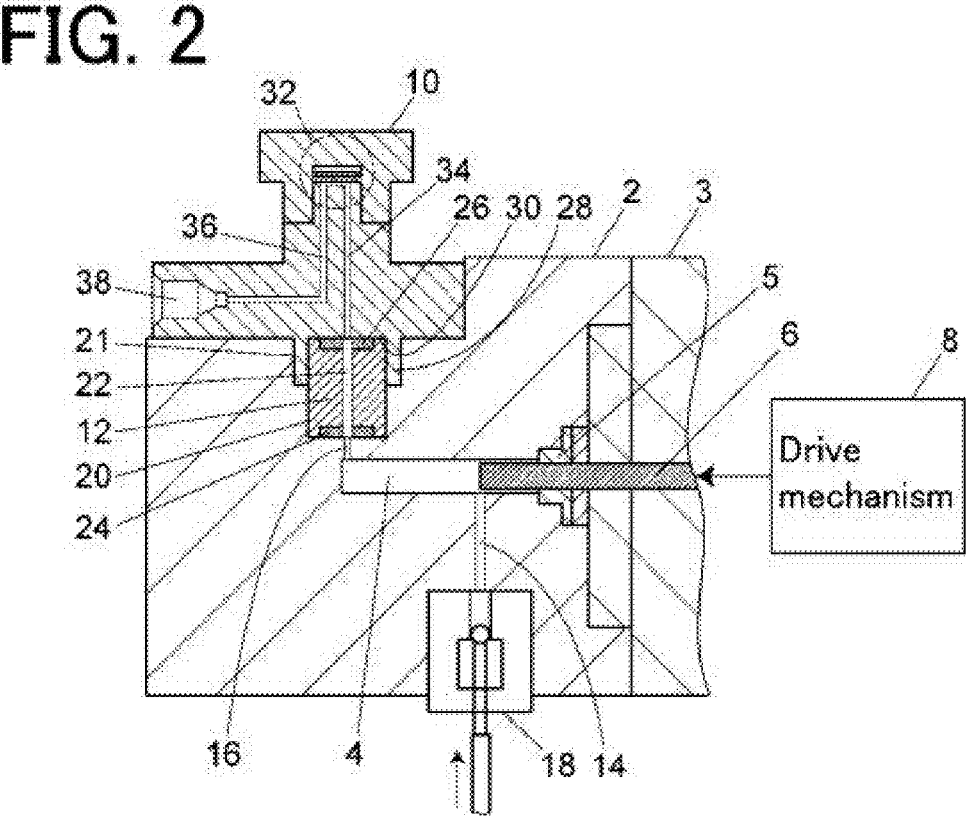
FIG. 2 is a cross-sectional configuration diagram showing a structure of the same embodiment.
Figure 3:
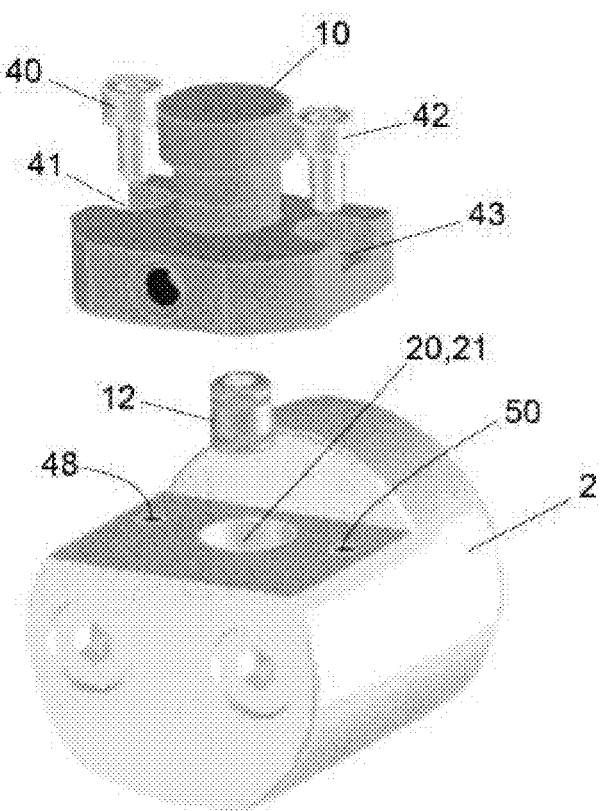
FIG. 3 is a perspective view showing a state in which a pressure detection apparatus is removed from the pump head of the same embodiment.
Figure 4:
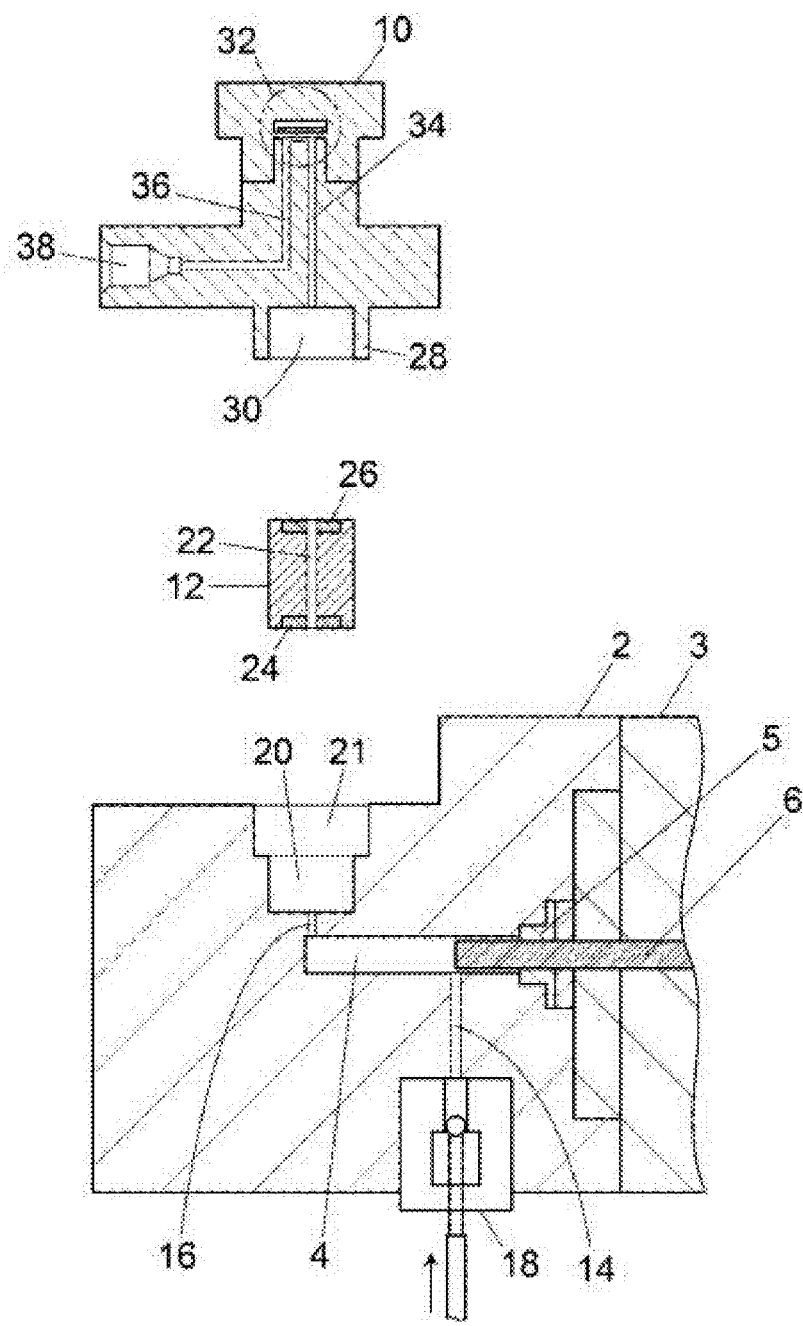
FIG. 4 is a disassembling cross-sectional configuration diagram showing the state of FIG. 3.

As shown in FIGS. 2 and 4, the plunger pump of this embodiment includes the pump head 2, a pump body 3, a plunger 6, a drive mechanism 8, the pressure detection apparatus 10, and a communication member 12.

The pump head 2 is attached to a tip end portion of the pump body 3. Inside the pump head 2, a pump chamber 4 that is a space having a cylindrical space, and an inlet flow path 14 and an outlet flow path 16 that lead to the pump chamber 4 are provided. The pump chamber 4 of the pump head 2 is open on a pump body 3 side, and a tip end of the plunger 6 is slidably inserted into the pump chamber 4 through the opening. The plunger 6 is reciprocated in an axial direction (left-right direction in FIG. 2) by the drive mechanism 8 provided on the pump body 3 side. An opening portion of the pump chamber 4 is sealed with a plunger seal 5.

As a configuration of the drive mechanism 8, for example, in addition to a configuration in which the plunger 6 is moved in the axial direction by rotating an eccentric cam by a motor, a configuration can be cited in which a ball screw is rotated by a motor, and a member holding a base end of the plunger is moved along the ball screw.

The inlet flow path 14 leads to a section between a tip end and a base end of the pump chamber 4. A check valve 18 is provided in the inlet flow path 14. The check valve 18 is for preventing a back flow of the liquid sucked into the pump chamber 4 into the inlet flow path 14. The outlet flow path 16 is a flow path for allowing the liquid sucked into the pump chamber 4 to flow out of the pump chamber 4, and leads to the tip end of the pump chamber 4.

The pressure detection apparatus 10 is detachably mounted on the pump head 2. As shown in FIGS. 1 and 3, in this embodiment, the pressure detection apparatus 10 is fixed to the pump head 2 by bolts 40 and 42. The pressure detection apparatus 10 is provided with through holes 41 and 43 through which the bolts 40 and 42 pass, respectively. Screw holes 48 and 50 for fitting and fastening the bolts 40 and 42 that have passed through the through holes 41 and 43 of the pressure detection apparatus 10 are provided in a portion where the pressure detection apparatus 10 of the pump head 2 is mounted. Note that reference signs 44 and 46 in FIG. 1 denote through holes through which bolts for mounting the pump head 2 on the pump body 3 are passed.

As shown in FIGS. 2, 3, and 4, the communication member 12 is sandwiched between the pump head 2 and the pressure detection apparatus 10. The communication member 12 is a member having a cylindrical shape with a through hole 22 inside. Seal members 24 and 26 each made of a resin and having elasticity are provided at one end portion and another end portion of the communication member 12, respectively. The seal members 24 and 26 are, for example, O-rings. An inner diameter of the through hole 22 is designed to be substantially the same as an inner diameter of the outlet flow path 16.

The pressure detection apparatus 10 includes a sensor part 32, an upstream flow path 34, and a downstream flow path 36 therein. The sensor part 32 is configured to have a flow path through which the liquid flows to detect a pressure of the liquid flowing through the flow path. The sensor part 32 is formed, for example, so thin that a part of a wall surface of the flow path through which the liquid flows is deformed by an internal pressure, and a distortion amount of the wall surface is detected by a strain sensor. The upstream flow path 34 is a flow path for allowing the liquid to flow into the sensor part 32, and the downstream flow path 36 is a flow path for allowing the liquid that has passed through the sensor part 32 to flow out from the pressure detection apparatus 10. A piping connection part 38 for connecting the piping is provided in an outer surface of the pressure detection apparatus 10, and an end portion of the downstream flow path 36 communicates with the piping connection part 38.

A protrusion 28 having a cylindrical shape is provided in one outer surface of the pressure detection apparatus 10, and a recess 30 (sensor-side recess) is provided inside the protrusion 28. An opening leading to the upstream flow path 34 is provided at a central portion of a bottom surface of the recess 30. An inner diameter of the recess 30 is designed to be slightly larger (for example, about 0.04 mm) than an outer diameter of the communication member 12.

A recess 21 for fitting the protrusion 28 of the pressure detection apparatus 10 is provided in an outer surface of the pump head 2 to which the pressure detection apparatus 10 is attached. An inner diameter of the recess 21 is substantially the same as an outer diameter of the protrusion 28 of the pressure detection apparatus 10. At a central portion of the recess 21, a recess 20 (pump head-side recess) for fitting a one end-side portion of the communication member 12 is provided. An opening leading to the outlet flow path 16 is provided at a central portion of a bottom surface of the recess 20.

An inner diameter of the recess 20 is also substantially the same as the outer diameter of the communication member 12. A depth dimension of the recess 20 is designed to be smaller than a length dimension of the communication member 12 in the axial direction. Thereby, when the one end-side portion (lower portion in FIGS. 2 to 4) of the communication member 12 is fitted into the recess 20, another end-side portion (upper portion in FIGS. 2 to 4) of the communication member 12 is protruded from the recess 20.

When the protrusion 28 of the pressure detection apparatus 10 is fitted into the recess 21 of the pump head 2 with the one end-side portion of the communication member 12 fitted into the recess 20, as shown in FIG. 2, the other end-side portion of the communication member 12 is fitted in the recess 30 of the pressure detection apparatus 10. In this state, the through hole 22 of the communication member 12 communicates with the outlet flow path 16, and an upstream flow path 34 communicates with the through hole 22. That is, the outlet flow path 16 and the upstream flow path 34 are in communication with each other through the through hole 22 of the communication member 12. In this state, the liquid discharged from the pump chamber 4 flows into the sensor part 32 through the outlet flow path 16, the through hole 22, and the upstream flow path 34, and the liquid that has passed through the sensor part 32 goes through the downstream flow path 36 and is fed through piping connected to the piping connection part 38.

In this way, the sensor part 32 is always in communication with the pump chamber 4 simply by fixing the pressure detection apparatus 10 to the pump head 2 by the bolts 40 and 42 with the communication member 12 sandwiched between the pressure detection apparatus 10 and the pump head 2, which brings about a state where the pressure inside the pump chamber 4 can be constantly monitored.

Since the pump head 2, the pressure detection apparatus 10, and the communication member 12 are configured separately from one another, if a failure occurs in the sensor part 32 inside the pressure detection apparatus 10, if the seal member 24 or 26 of the communication member 12 deteriorates, or the like, the bolts 40 and 42 are removed, and only the pressure detection apparatus 10 or the communication member 12 can be replaced.

DESCRIPTION OF REFERENCE SIGNS

2: Pump head
3: Pump body
4: Pump chamber
5: Plunger seal
6: Plunger
8: Drive mechanism
10: Pressure detection apparatus
12: Communication member
14: Inlet flow path
16: Outlet flow path
18: Check valve
20: Recess (Pump head-side recess)
21: Recess
22: Through hole
24, 26: Seal member
28: Protruded portion
30: Recess (Sensor-side recess)
32: sensor part
34: Upstream flow path
36: Downstream flow path
40, 42: Bolt

The invention claimed is:

1. A plunger pump comprising:
a pump head comprising a pump chamber, an inlet flow path and an outlet flow path therein, and is provided with a pump head-side recess in an outer surface, the inlet flow path and the outlet flow path communicating with the pump chamber, and the pump head-side recess having an opening, which is leading to the outlet flow path, in a bottom surface;
a plunger having a tip end portion slidably inserted into the pump chamber;
a drive mechanism configured to reciprocate the plunger in an axial direction of the plunger;
a communication member having one end and another end, the communication member having a through hole extending from the one end to the other end, a portion including the one end is fitted into the pump head-side recess so that the through hole communicates with the outlet flow path and a portion including the other end protrudes from the pump head-side recess; and
a pressure detection apparatus having a sensor part, an upstream flow path and a downstream flow path therein, the sensor part being for detecting a fluid pressure, the upstream flow path being for leading a liquid into the sensor part, the downstream flow path being for leading the liquid having passed the sensor part to outside of the sensor part, the pressure detection apparatus being provided with a sensor-side recess in an outer surface, the sensor-side recess having an opening, which is leading to the upstream flow path, in a bottom surface, wherein the pressure detection apparatus is detachably mounted on the pump head in a state where the portion including the other end of the communication member protruded from the pump head-side recess is fitted into the sensor-side recess so that the upstream flow path is communicated with the outlet flow path through the through hole.

2. The plunger pump according to claim 1, wherein the pressure detection apparatus has a piping connection part, which is for connecting piping to the downstream flow path, in the outer surface.

3. The plunger pump according to claim 1, wherein the pressure detection apparatus is fixed to the pump head by a bolt.

4. The plunger pump according to claim 1, wherein seal members made of a resin and having elasticity are provided at one end portion and another end portion of the communication member, respectively.

5. The plunger pump according to claim 1, wherein an inner diameter of the through hole of the communication member is the same as an inner diameter of the outlet flow path.

6. The plunger pump according to claim 1, wherein the sensor part is formed so thin that a part of a wall surface of the flow path through which the liquid flows is deformed by an internal pressure, and a distortion amount of the wall surface is detected by a strain sensor.

7. A liquid chromatograph comprising the plunger pump according to claim 1.

8. A supercritical fluid chromatograph comprising the plunger pump according to claim 1.

* * * * *